ization">. Version D0.9a. PCI Industrial Computers Manufacturing
Group. Jun. 15, 2004.*

(12) United States Patent
DeNies et al.

(10) Patent No.: US 7,266,627 B2
(45) Date of Patent: Sep. 4, 2007

(54) METHOD AND APPARATUS TO COUPLE A REAR TRANSITION MODULE TO A CARRIER BOARD

(75) Inventors: Steven DeNies, East Aurora, NY (US); Mark Summers, Phoenix, AZ (US); Edoardo Campini, Mesa, AZ (US); Lawson Guthrie, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 11/087,331

(22) Filed: Mar. 23, 2005

(65) Prior Publication Data

US 2006/0218329 A1 Sep. 28, 2006

(51) Int. Cl.
*G06F 13/36* (2006.01)

(52) U.S. Cl. .................. 710/301; 710/104; 710/10

(58) Field of Classification Search ............ 710/10, 710/11, 72, 104
See application file for complete search history.

(56) References Cited

U.S. PATENT DOCUMENTS

| 7,126,820 | B2 | 10/2006 | Wei |
| 2004/0059856 | A1* | 3/2004 | Chan et al. ............... 710/301 |
| 2004/0230866 | A1* | 11/2004 | Yates et al. ............... 714/25 |
| 2005/0099772 | A1 | 5/2005 | Wei |
| 2006/0059290 | A1* | 3/2006 | McKeown ................ 710/305 |
| 2006/0062226 | A1* | 3/2006 | Harris et al. .............. 370/401 |
| 2006/0095809 | A1* | 5/2006 | Wallace et al. ........... 713/500 |
| 2006/0139904 | A1* | 6/2006 | Wei et al. ................. 361/788 |
| 2006/0206647 | A1* | 9/2006 | Stahl et al. ............... 710/301 |
| 2006/0211298 | A1* | 9/2006 | Campini et al. .......... 439/502 |

OTHER PUBLICATIONS

Webb, Warren. "A New Embedded Architectures: Bigger better boards". EDN. Apr. 15, 2004, pp. 37-46.*
"Advanced TCA PICMG 3.0 Short Form Specification". PCI Industrial Computers Manufacturing Group. Jan. 2003.*
"PICMG AMC.0 Advanced Mezzanine Card Short Form Specification". Version D0.9a. PCI Industrial Computers Manufacturing Group. Jun. 15, 2004.*
Summers, Mark. "Advanced Mezzanine Card Brief Overview and Update of PICMG AMC.0". Bus&Board 2004. Jan. 20, 2004.*
Guthrie, Lawson et al. "Advanced Mezzanine Card theory of operations". CompactPCI and AdvancedTCA Systems. Apr. 2005.*
Beaton, John et al. "Usage models for Advanced Mezzanine Card (AdvancedMC)". CompactPCI Systems. Nov. 2003.*
Beaton, John et al. "Advanced Mezzanine Card fulfills the promice of Advanced TCA". CompactPCI Systems. Oct. 2003.*
Zeile, Mike. "Ann efficient interconnectfor Advanced Mezzanine Cards". CompactPCI Systems. Oct. 2004.*
Zeile, Mike. "Switching Strategies For Advanced TCA". Fulcrum Microsystems. Apr. 2005.*
PCI Industrial Computer Manufacturers Group (PICMG), Advanced Telecommunications Computing Architecture (ATCA) Base Specification, PIGMG 3.0 Revision 1.0, published Dec. 30, 2002.
Advanced Mezzanine Card (AMC) Specification, PIGMG AMC.0, Revision 1.0, published Jan. 3, 2005.

* cited by examiner

*Primary Examiner*—Mark H. Rinehart
*Assistant Examiner*—Thomas J. Cleary
(74) *Attorney, Agent, or Firm*—Caven & Aghevli LLC

(57) ABSTRACT

A method and apparatus to couple a rear transition module to a carrier board includes detecting a rear transition module (RTM) coupled to an interface resident on a carrier board, the carrier board coupled to a backplane. The method further includes logically coupling the RTM to a management controller resident on the carrier board and managing the RTM in a same manner as a front accessible module coupled to another interface resident on the carrier board.

23 Claims, 8 Drawing Sheets

METHOD AND APPARATUS TO COUPLE A
REAR TRANSITION MODULE TO A
CARRIER BOARD

TECHNICAL FIELD

Embodiments of the invention generally relate to the field of electronic systems, and more particularly, to a method and apparatus to couple a rear transition module to a carrier board.

BACKGROUND

Modular systems are typically used in communication networks where reliability and cost effectiveness are important factors. The modularity of the components in a modular system helps to reduce costs and improve reliability. A key component of a modular system is the modular platform. A modular platform includes, but is not limited to, backplanes that receive various types of interconnects. These interconnects may further include interfaces to receive modules that provide additional functionality to the modular platform. These modules may include, but are not limited to, front accessible modules and rear transition modules (RTMs).

Typically, backplanes in modular platforms are designed to receive interconnects that have a common design. This creates modularity by allowing interconnects to be interchanged in a modular platform. For example, interconnects may be designed in compliance with the PCI Industrial Computer Manufacturers Group (PICMG), Advanced Telecommunications Computing Architecture (ATCA) Base Specification, PIGMG 3.0 Revision 1.0, published Dec. 30, 2002 (hereinafter referred to as "the ATCA specification"). If an interconnect is designed to be compliant with the ATCA specification, the interconnect will be interchangeable with other ATCA compliant interconnects.

A type of interconnect, often called a "carrier board," includes interfaces to receive and couple to modules. One type of module to be received and coupled to a carrier board is a front accessible module. Similar to ATCA compliant interconnects, a front accessible module's compliance with a specification may also result in interchangeability. One example specification is the Advanced Mezzanine Card (AMC) Specification, PIGMG AMC.0, Revision 1.0, published Jan. 3, 2005 (hereinafter referred to as "the AMC.0 specification").

In contrast to ATCA complaint interconnects and AMC.0 compliant front accessible modules, no one specification describes a common design that enables the same degree of interchangeability for RTMs. As a result, carrier boards that include an interface to receive and couple to an RTM are designed for a specific RTM. Thus, the typical RTM is not interchangeable across different carrier board/RTM combinations. Since interchangeability helps to reduce costs and improve reliability, the lack of carrier board/RTM interchangeability is problematic.

BRIEF DESCRIPTION OF THE DRAWINGS

The invention is illustrated by way of example, and not by way of limitation, in the figures of the accompanying drawings in which like reference numerals refer to similar elements and in which.

DETAILED DESCRIPTION

Embodiments of the invention are generally directed to a method and apparatus to couple a rear transition module to a carrier board. A carrier board manager is introduced herein. The carrier board manager is operable to logically couple a rear transition module (RTM) to a carrier board coupled to a backplane. The logical coupling facilitates management of the RTM in a same manner as a front accessible module coupled to the carrier board.

Figure 1:
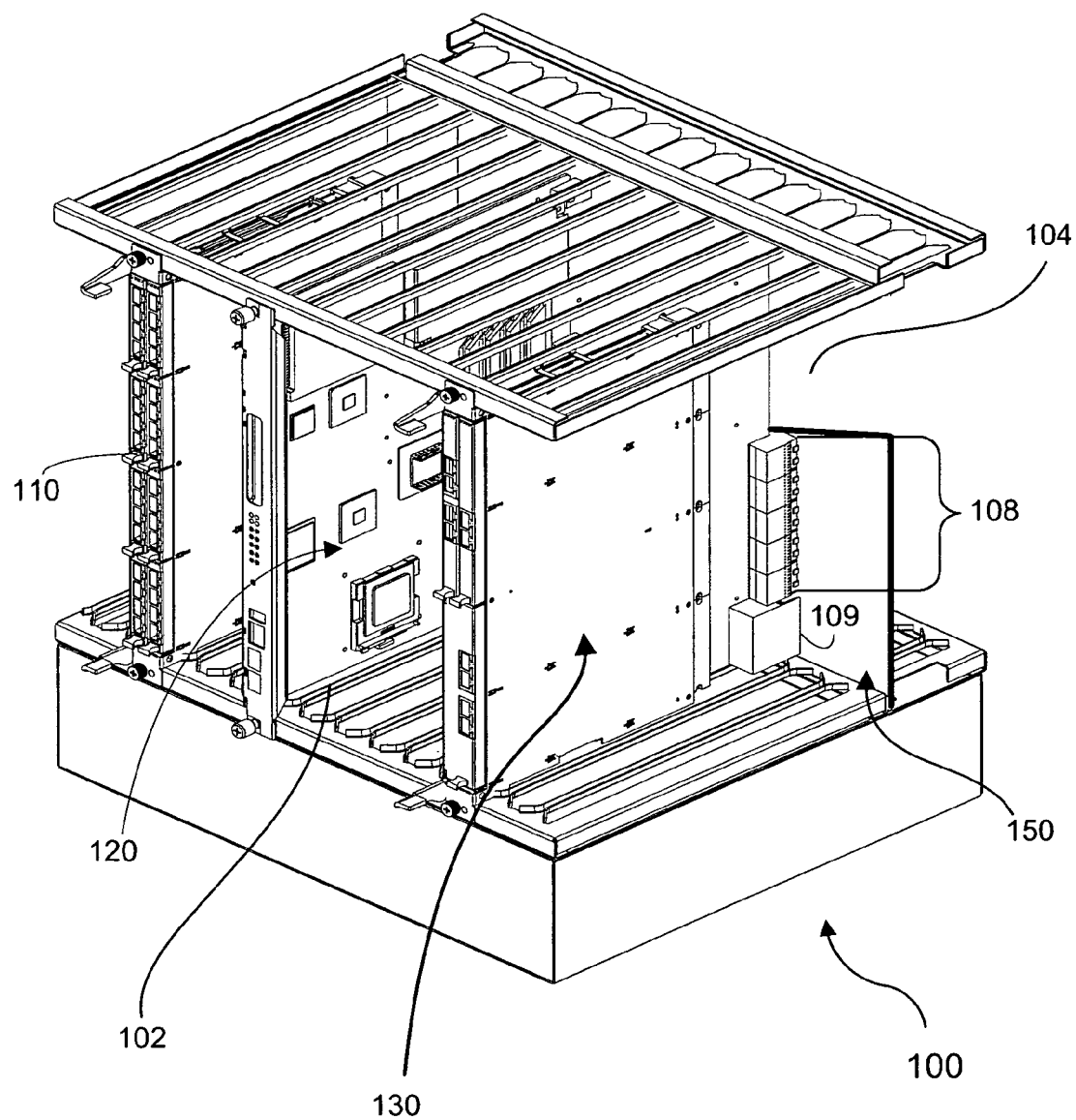
FIG. 1 provides a partial view of an example modular platform, according to one embodiment.

FIG. 1 provides a partial view of an example modular platform 100, according to one embodiment. Modular platform 100 may be a telecommunications server designed to be compliant with the ATCA specification, although the scope of the invention is not limited in this respect. FIG. 1 shows a partial view of modular platform 100 having selected portions removed for clarity.

Modular platform 100 is shown including interconnects 110, 120 and 130. In an embodiment, each interconnect may include one or more input/output (I/O) interfaces (e.g., interconnect 130 includes I/O connectors 108) which enable the interconnect to couple to a backplane 150. When an interconnect is coupled to backplane 150, these I/O interfaces may enable communication with modular platform 100 system management devices, other interconnects in modular platform 100 or electronic systems located remotely to modular platform 100.

Each interconnect may also contain a power interface (e.g., interconnect 110 includes power connectors 109) through which power is received when coupled to modular platform 100. As explained in more detail below, each interconnect may also contain module interfaces (not shown in FIG. 1) to receive and couple modules (e.g. front accessible and rear transition modules) to the interconnect.

Modular platform 100 is also depicted in FIG. 1 as including a front portion 102 and a rear portion 104. In one embodiment, interconnects 130 and 110 may be carrier boards designed to receive and couple to one or more modules. These modules may include, but are not limited to, front accessible modules and RTMs. Front accessible modules, for example, are modules which may be received and coupled to carrier boards 130 or 110 via front portion 102. RTMs, for example, are modules which may be received and coupled to carrier boards 130 or 110 via rear portion 104. An RTM may also be received and coupled to other interconnects (e.g., interconnect 120) via rear portion 104.

Figure 2:
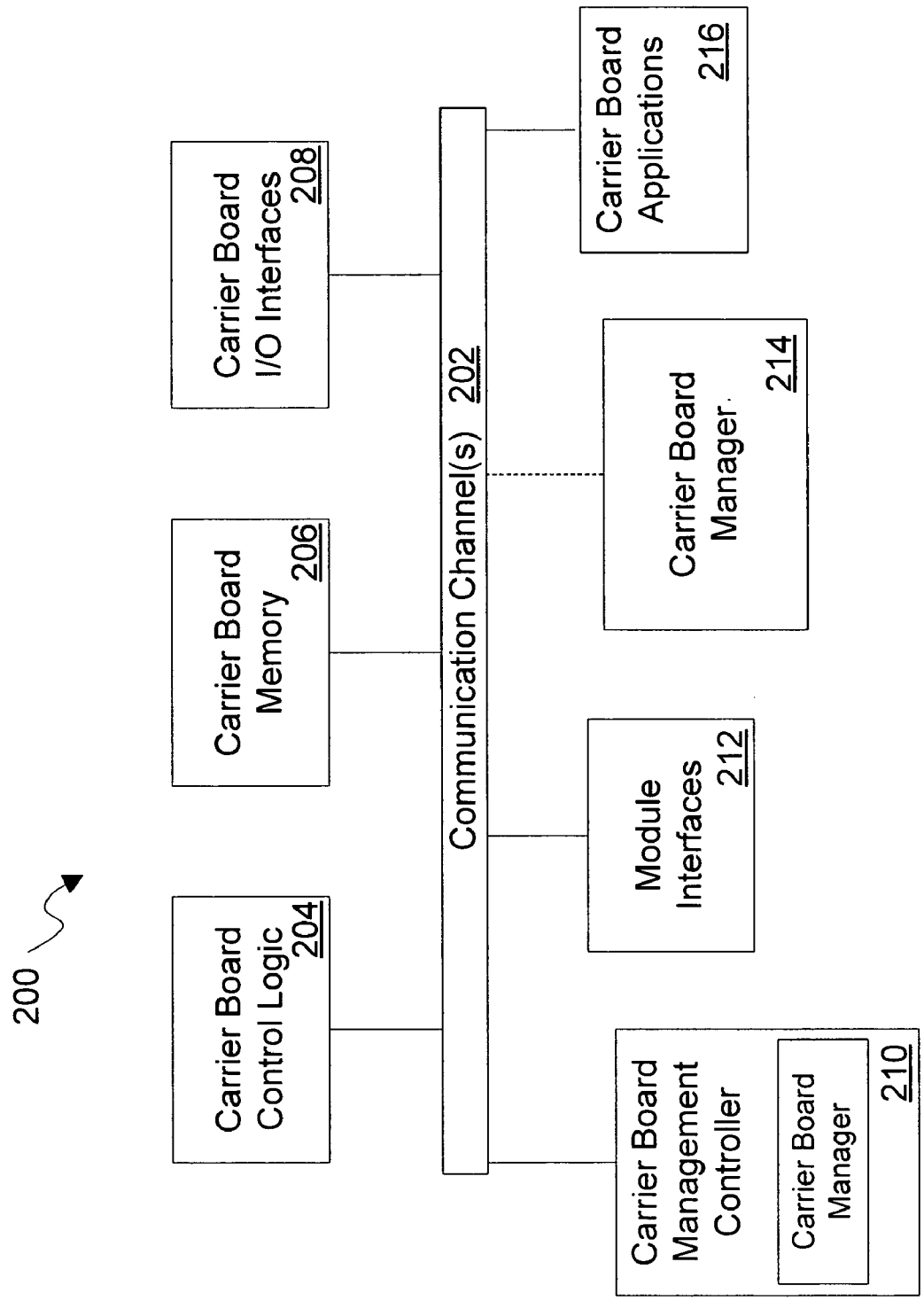
FIG. 2 illustrates an example electronic system, according to one embodiment.

FIG. 2 illustrates an example electronic system, according to one embodiment. The elements shown in electronic system 200 may represent an architectural diagram of hardware and/or software elements responsive to or resident on carrier board 110. These elements may manage and/or control one or more modules received and coupled to carrier board 110. As shown, electronic system 200 is depicted as including one or more communication channel(s) 202, carrier board control logic 204, carrier board memory 206, carrier board I/O interfaces 208, carrier board management controller 210, module interfaces 212, carrier board manager 214 and carrier board applications 216.

In an embodiment, communication channel(s) 202 may include communication links routed between elements of electronic system 200 and may also include communication links routed through I/O connectors 108 to a modular platform backplane.

In an embodiment, carrier board memory 206 may store information/features offered by electronic system 200. Carrier board memory 206 may also be used to store temporary variables or other intermediate information during execution of instructions by carrier board control logic 204.

In an embodiment, carrier board control logic 204 may invoke an instance of carrier board applications 216 and/or carrier board management controller 210 to provide control and/or management for one or more modules that may be received and coupled to module interfaces 212. Control and/or management may be provided through communication channel(s) 202 or a combination of communication channel(s) 202 and carrier board I/O interfaces 208. For example, communication channel(s) 202 may include one or more carrier board management channels (e.g., a bus and/or a serial interface) to facilitate this control and/or management. Other elements of electronic system 200 may also communicate in the same manner, although the invention is not limited in this regard.

Figure 3:
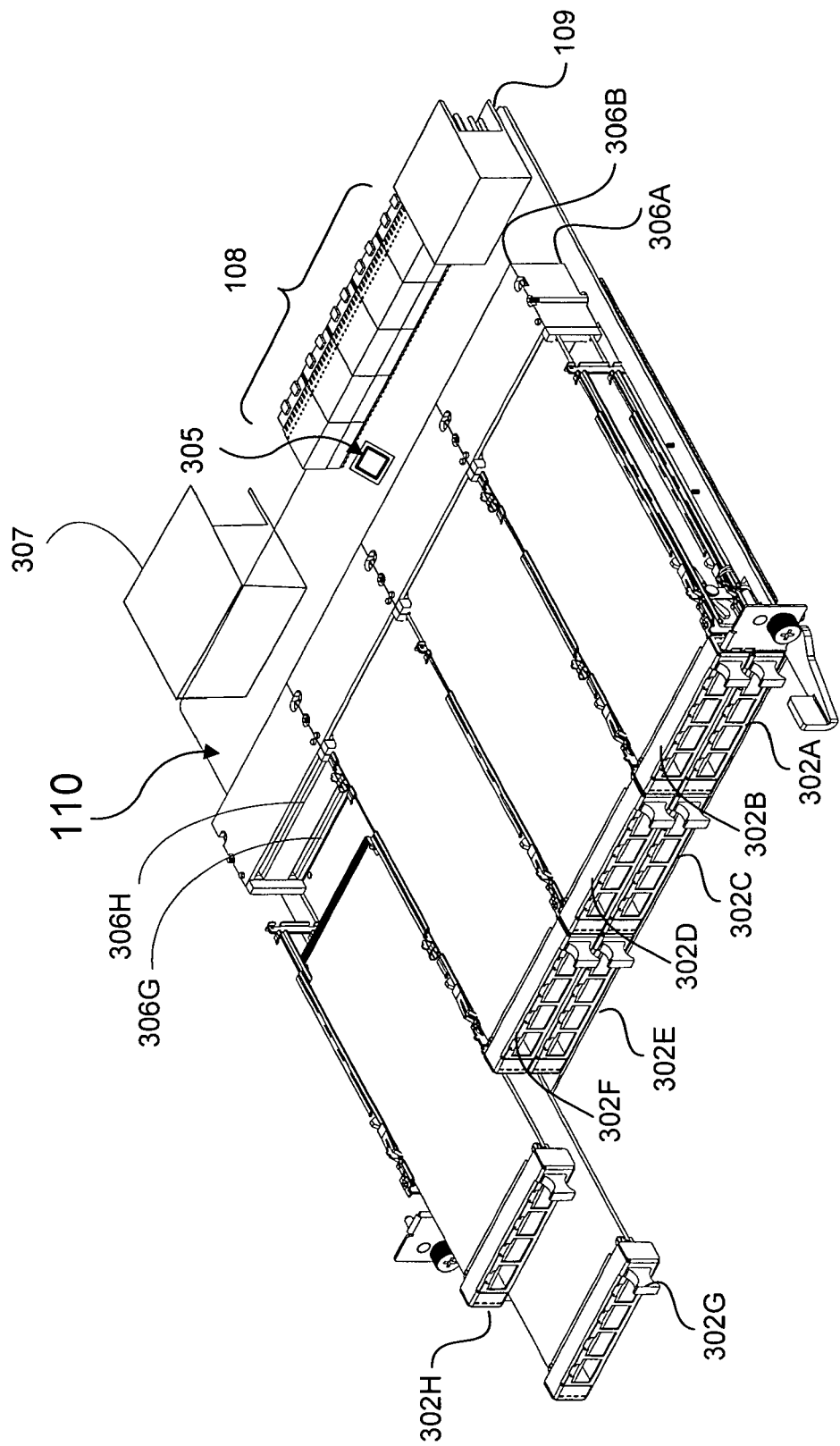
FIG. 3 is an isometric view of an example carrier board, according to one embodiment.

FIG. 3 is an isometric view of an example carrier board 110, according to one embodiment. Carrier board 110 includes module interfaces 306A-H, carrier board management controller 305, RTM interface 307, I/O connectors 108 and power connectors 109.

In the embodiment shown in FIG. 3, front accessible modules 302A-G are depicted already received and coupled to module interfaces 306A-G. Additionally, front accessible module 302H is about to be coupled to module interface 306H. No RTM is shown received and coupled to RTM interface 307. The receiving and coupling of an RTM to RTM interface 307 is discussed below in connection with FIGS. 4-8.

In an embodiment, module interfaces 212 of electronic system 200 may include module interfaces 306A-H and RTM interface 307. Accordingly, in one example, carrier board control logic 204 invokes an instance of carrier board manager 214 to logically couple an RTM and/or a front accessible module to carrier board management controller 210.

In one embodiment, carrier board management controller 210 may include carrier board management controller 305. In this embodiment, once a module is received and coupled to a module interface on carrier board 110, carrier board manager 214 may then logically couple the module to carrier board management controller 305. After the module is logically coupled to carrier board management controller 305, carrier board management controller 305 may provide management and/or control functionality to the module. For example, a logically coupled front accessible module may request to communicate with an RTM also logically coupled to carrier board management controller 305. Carrier board management controller 305 may service the request and facilitate and/or control the communications between these modules, although the invention is not limited in this regard.

In one embodiment, RTM interface 307 may include low voltage differential signaling (LVDS) I/O ports (not shown) that are similar and/or compatible with LVDS I/O ports included in module interfaces 306A-H. This may, for example, facilitate the mapping of LVDS I/O ports to other modules coupled to carrier board 110. This mapping, for example may enable the use of various communication protocols (e.g., Ethernet, PCI-Express, ATM, Rapid I/O, etc.) to communicate between an RTM received and coupled to RTM interface 307 and modules received and coupled to module interfaces 306A-H and/or other interconnects coupled to carrier board 110.

In one embodiment, RTM interface 307 may include power feeds (not shown) that are similar and/or compatible with power feeds included in module interfaces 306A-H. For example, RTM interface 307 may include a power feed that is at one voltage for management functions and a power feed that is at another voltage for payload functions. For example, management functions, may only require a low amount of voltage to determine an RTM's compatibility with a carrier board before the RTM is fully powered at a higher voltage to perform payload functions.

In one embodiment, RTM interface 307 may include a control channel (not shown) to enable a module to communicate with carrier board management controller 305 to determine the compatibility of an RTM with carrier board 110. This may occur prior to management controller 305 fully enabling additional functions in the RTM. In one implementation, the control channel may enable an RTM to communicate to carrier board management controller 305 its power compatibility requirements before carrier board 110 provides additional power to the RTM to enable additional functions.

In an embodiment, module interfaces 306A-H may also be referred to as "carrier bays" and front accessible modules 302A-H may also be referred to as "mezzanine cards."

Figure 4:
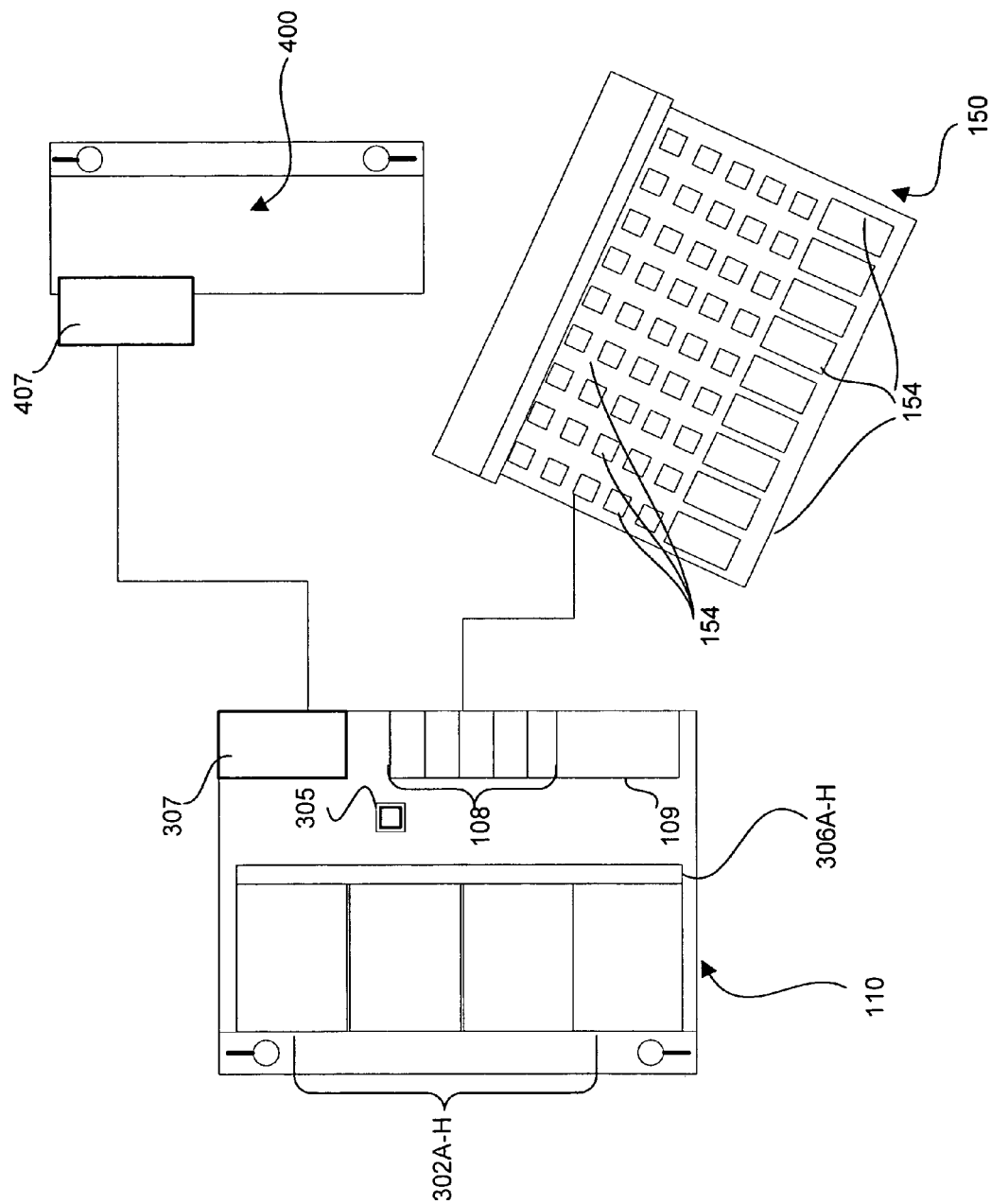
FIG. 4 provides an exploded view of an example carrier board, backplane and rear transition module (RTM), according to one embodiment.

FIG. 4 provides an exploded view of an example carrier board 110, backplane 150 and RTM 400, according to one embodiment. In this embodiment, carrier board 110 may be coupled to both backplane 150 and RTM 400 within modular platform 100.

In one embodiment, backplane 150 includes power connectors 152 to distribute power to components coupled to backplane 150. Backplane 150 also includes I/O connectors 154. I/O connectors 154 may provide data transport interfaces to route I/O signals. For example, I/O connector 108 on carrier board 110 may couple to I/O connector 154. This coupling may enable communications between carrier board 110 and modular platform 100 system management devices, other boards coupled to I/O connectors 154, or electronic systems located remotely to modular platform 100.

In one embodiment, when carrier board 110 is coupled to backplane 150, RTM 400 may be received and coupled to carrier board 110 in the area above backplane 150. For example, RTM 400 may be received and coupled to RTM interface 307 through interface 407. An example of this coupling is illustrated more clearly with reference to FIG. 5.

Figure 5:
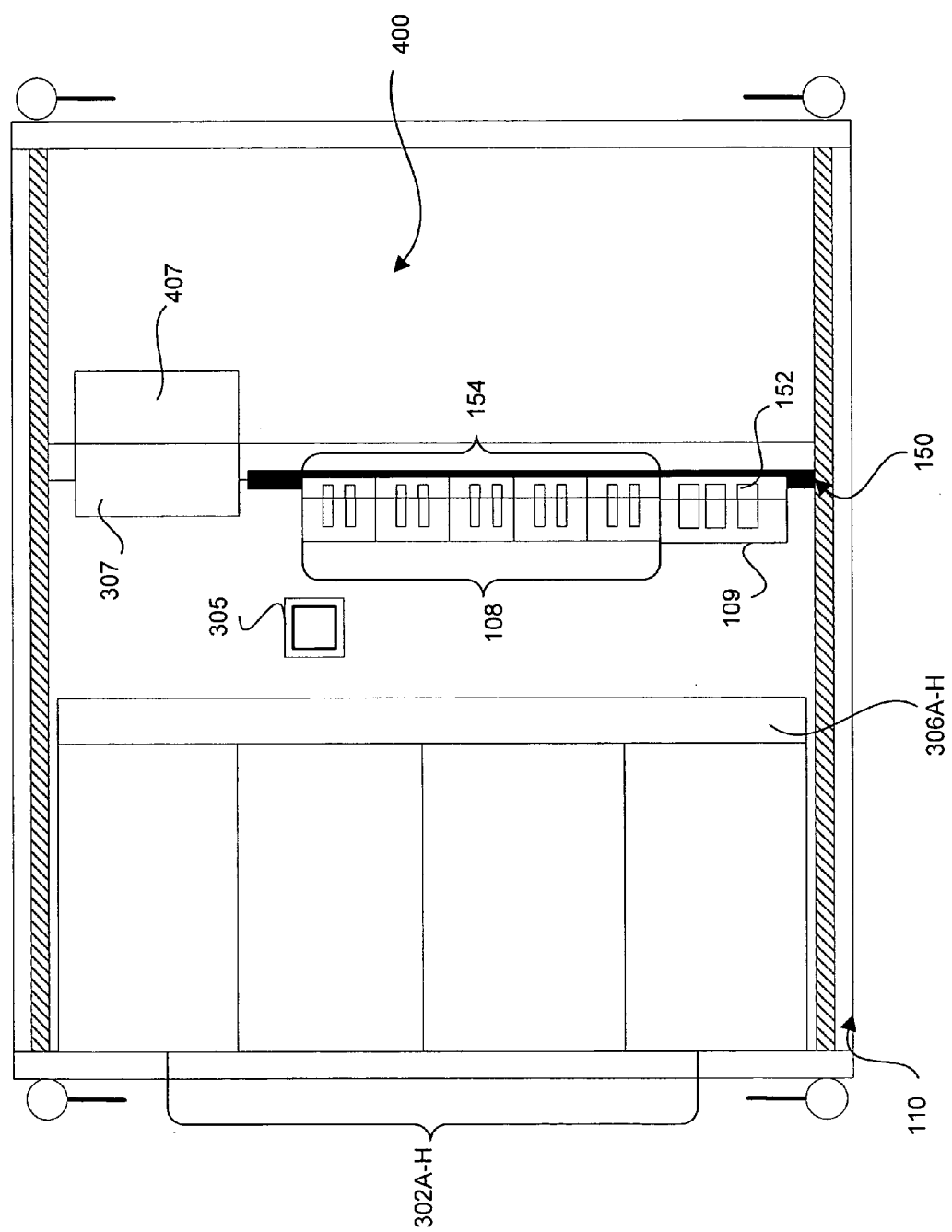
FIG. 5 provides a side view of a portion of an example modular platform, according to one embodiment.

Turning briefly to FIG. 5, a side view of an example portion of modular platform 100 is presented. According to one embodiment, FIG. 5 depicts the physical relationship between carrier board 110, backplane 150 and RTM 400, when carrier board 110 is coupled to both backplane 150 and to RTM 400. In this embodiment, RTM 400 is received and coupled to RTM interface 307 through interface 407.

Figure 6:
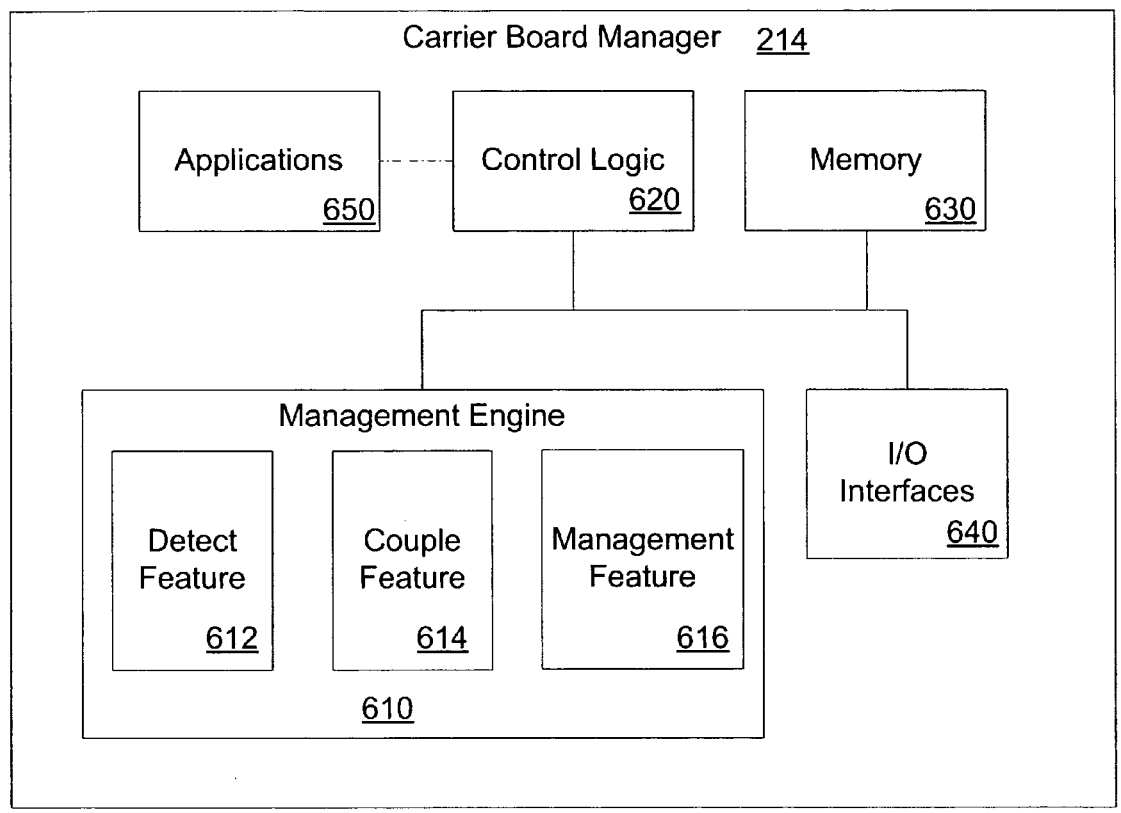
FIG. 6 is an example architectural diagram of a carrier board manager, according to one embodiment.

FIG. 6 is an example architectural diagram of a carrier board manager 214, according to one embodiment. Carrier board manager 214 includes a management engine 610, control logic 620, memory 630, I/O interface 640, and optionally one or more applications 650, each coupled as depicted.

In an embodiment, management engine 610 may include a detect feature 612, couple feature 614, and management feature 616. Detect feature 612 detects when a module is received in a module interface resident on an interconnect. Couple feature 614 logically couples the received module to a management controller responsive to and/or resident on the interconnect. Management feature 616 then facilitates the management and/or control of the module by the management controller.

In one embodiment, an RTM is logically coupled to carrier board management controller 305. This RTM may logically appear to carrier board management controller 305 as another module (e.g., a front accessible module) received and coupled to carrier board 110. As a result, the RTM may be managed in the same manner as the front accessible module, although the invention is not limited in this regard.

Control logic 620 controls the overall operation of carrier board manager 214 and is intended to represent any of a wide variety of logic device(s) and/or executable content to implement the operation of carrier board manager 214. Control logic 620 may well comprise a microprocessor, network processor, microcontroller, field programmable gate array (FPGA), application specific integrated circuit (ASIC), or executable content to implement such control features, and/or any combination thereof. In alternate embodiments, the features and functionality of control logic 620 may well be implemented within management engine 610.

In an embodiment, control logic 620 invokes an instance of management engine 610 to logically couple a module received in a module interface resident on a carrier board to a management controller responsive to the carrier board.

As used herein, memory 630 is intended to represent a wide variety of memory media including, but not limited to volatile memory, non-volatile memory, flash and programmatic variables or states. According to an embodiment, memory 630 is used to temporarily store one or more tables. These tables may be used to facilitate the logical coupling of a module to a management controller responsive to a carrier board and to facilitate the management/control of the module once logically coupled, although the invention is not limited in this regard.

I/O interfaces 640 provide a communication interface between carrier board manager 214 and an electronic system. For example, carrier board manager 214 may be implemented as an element of an electronic system (e.g., electronic system 200), wherein I/O interfaces 640 provide a communication interface between carrier board manager 214 and the electronic system via a communication channel (e.g., communication channel(s) 202). Control logic 620 can receive a series of instructions from application software external to carrier board manager 214 via I/O interfaces 640. The series of instructions may invoke control logic 620 to implement one or more features of management engine 630.

In an embodiment, carrier board manager 214 may include one or more applications 650 to provide instructions to control logic 620. Such applications 650 may well be invoked to generate a user interface, e.g., a graphical user interface (GUI), to enable administration features, and the like. In alternate embodiments, one or more features of management engine 630 may well be implemented as applications 650, invoked by control logic 620 to invoke such features.

Figure 7:
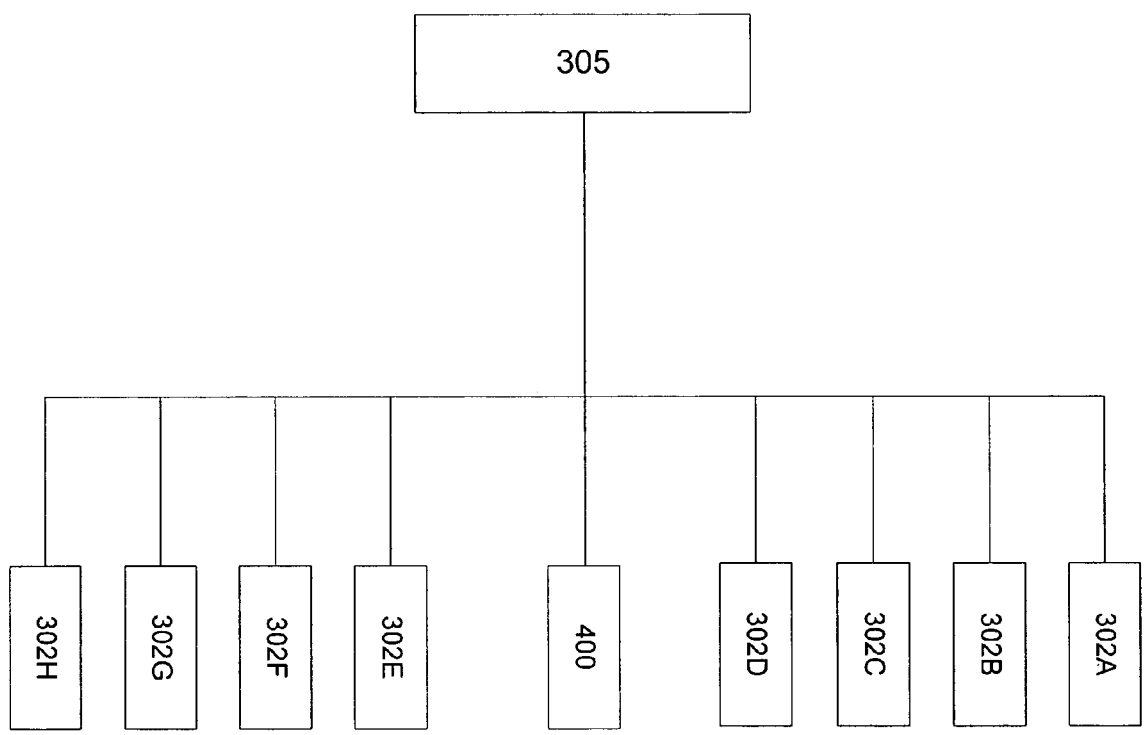
FIG. 7 illustrates an example block diagram architecture for the logical coupling of modules to a management controller on a carrier board, according to one embodiment.

FIG. 7 illustrates an example block diagram architecture 700 for the logical coupling of modules to management controller 305 on carrier board 110, according to one embodiment. In this embodiment, carrier board 110 is to be received and coupled to backplane 150 on modular platform 100. Carrier board 110 and modular platform 100 may be compliant with the ATCA specification. Accordingly, modular platform 100 may manage/control boards or interconnects over a system management bus known as the Intelligent Platform Management Bus or "IPMB-0" (not shown). When carrier board 110 is received and coupled to backplane 150, a modular platform 100 system management functional element known as a "shelf manager" may detect this coupling and may enable power and/or communication links to carrier board 110. Once carrier board 110 is coupled to backplane 150, the shelf manager may continue to monitor and control carrier board 110 as well as other interconnects coupled to the backplane and responsive to the IPMB-0.

Carrier board 110 may also contain a management controller described in the ATCA specification as an Intelligent Platform Management Controller or "IPMC." The IPMC may manage the communications between carrier board 110 and the shelf manager. Carrier board 110 may also be compliant with the AMC.0 specification. Accordingly, carrier board 110's IPMC may relay any instructions and/or information from the shelf manager to modules coupled to the carrier board over a carrier board management channel. This carrier board management channel is described in the AMC.0 specification as the Intelligent Platform Management Bus-Local or "IPMB-L". The AMC.0 specification further describes that modules coupled to a compliant carrier board contain module management controllers or "MMCs" (not shown). An AMC.0 compliant carrier board's IPMC may be linked to each AMC.0 compliant module's MMC through the IPMB-L, although the invention is not limited in this regard.

According to one embodiment, MMCs may well comprise one or more of a microprocessor, network processor, microcontroller, FPGA or ASIC resident on and/or responsive to a module. MMCs may also include executable content to implement the functionality of an MMC as described in the AMC.0 specification, although the invention is not limited in this regard.

According to one embodiment, carrier board management controller 305 may perform the functionality of an IPMC. Thus, when modules (e.g., front accessible modules and/or RTMs) are received and coupled to carrier board 110, carrier board management controller 305 may couple to a module's MMC through the IPMB-L. Thus, for example, the shelf manager may communicate to carrier board management controller 305 over IPMB-0 and carrier board management controller 305 may relay that communication to modules coupled to carrier board 110 over IPMB-L, although the invention is not limited in this regard.

In one embodiment, RTM interface 307 may include power feeds that are compliant with the AMC.0 specification. For example, RTM interface 307 may include power feeds which provide a voltage of 12 volts for payload functions and 3.3 volts for management functions. RTM interface 307 may also include LVDS I/O ports that are also compliant with the AMC.0 specification and the LVDS I/O ports may be mapped accordingly.

In one embodiment, RTM interface 307 may include a control channel or interface that is compliant with the AMC.0 specification. For example, the AMC.0 compliant control interface may enable an RTM to communicate compatibility requirements to carrier board management controller 305 before carrier board 110 fully enables and/or powers up the RTM. The control interface may utilize, for example, a 100 Mbit Ethernet communication channel, although the invention is not limited in this regard.

In one embodiment, ATCA/AMC.0 compliant carrier board 110 is received and coupled to backplane 150 on modular platform 100. Once coupled to backplane 150, carrier board control logic 204 invokes an instance of carrier board manager 214 to logically couple carrier board management controller 305 to modules already received and coupled to module interfaces resident on carrier board 110. For example, management engine 630 invokes an instance of detect feature 612 to survey what modules are received and coupled to module interfaces 306A-H and/or RTM interface 307. Detect feature 612 may then place the results of the survey into a survey table temporarily stored in a memory (e.g., memory 630). After the survey table is populated, management engine 630 invokes an instance of couple feature 614 to access the survey table and then logically couple each module to carrier board management controller 305, although the invention is not limited in this regard.

In one embodiment, couple feature 614 may use the survey table to logically couple each module to carrier board management controller 305 through communication channels routed through a module's interface (e.g., IPMB-L, LVDS I/O port, control interface) and then may update a module configuration table to reflect that logical coupling. This table may be stored in a memory (e.g., memory 630) and may indicate the logical coupling of modules to carrier board management controller 305 as depicted in block diagram architecture 700. In addition, the module configuration table may include information to determine the configuration of modules logically coupled to carrier board management controller 305. These module configurations may include, but are not limited to, the number of differential signal pairs activated, pin configurations/mappings, compatibility status, power/voltage requirements, thermal/cooling requirements, or other mechanical or electrical configurations, and the like.

Once the module configuration table is stored in a memory, detect feature 612 may monitor front accessible module interfaces 306A-H and RTM interface 307 to detect whether a module is either uncoupled or a new module is received and coupled. If a module is removed and/or another module is added, couple feature 614 may then update the module configuration table to reflect any possible changes.

In an embodiment, management engine 630 invokes an instance of management feature 616 to facilitate carrier board management controller 305's management and/or control of front accessible modules 302A-H and RTM 400. Management feature 616 may first access the module configuration table updated by couple feature 614. Once the table is accessed, management feature 616 may utilize the table, for example, to route management and control instructions to MMCs resident on modules logically coupled to carrier board management controller 305. These management and control instructions may originate from carrier board management controller 305 and may include, for example, instructions to power down a module, prepare a module to be hot swapped, and/or activate a module once compatibility is determined, although the invention is not limited to these management and control instructions. Since management feature 616 facilitates carrier board management controller 305's management and/or control of all modules received and coupled to carrier board 110, then RTM 400 is possibly managed in a same manner as front accessible modules 302A-H.

In another embodiment, the shelf manager on modular platform 100 may want to power down at least a portion of the modules received and coupled to module interfaces on carrier board 110. Thus, the shelf manager sends a power down request over the IPMB-0 to carrier board management controller 305. Management feature 616 may then access the module configuration table stored in memory (e.g., memory 630) to facilitate routing of the power down request over the IPMB-L to modules logically coupled to carrier board management controller 305. The modules may then power down to meet the shelf manager's request.

Figure 8:
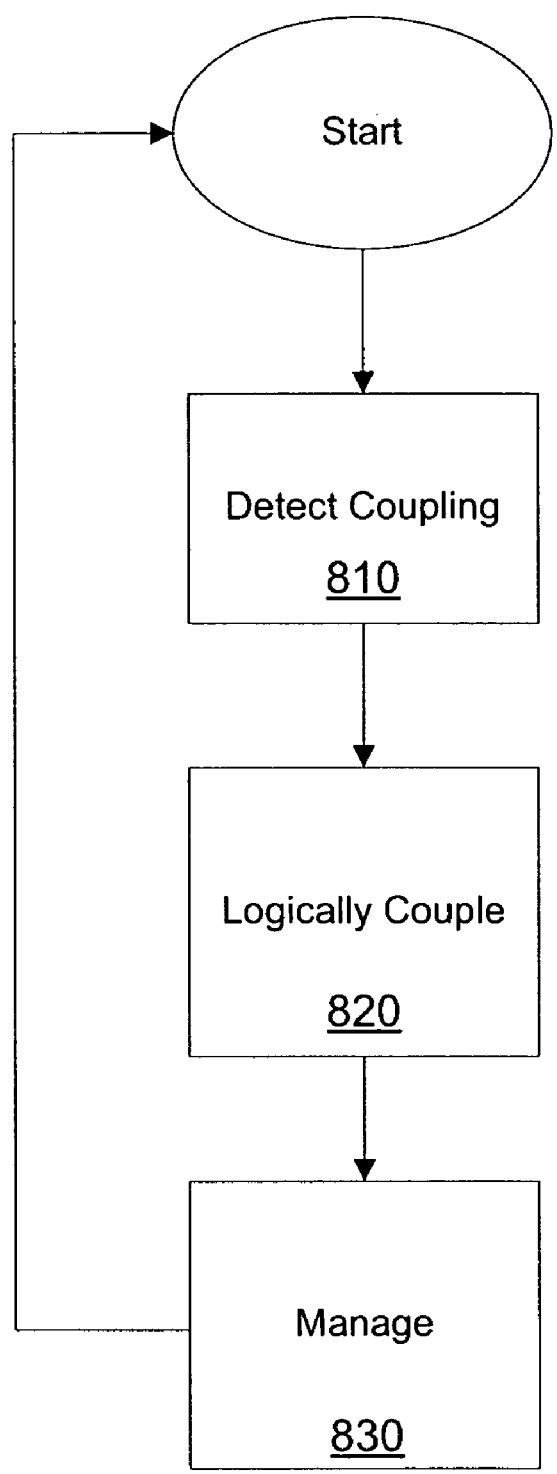
FIG. 8 is an example flow chart of a method to couple an RTM to a carrier board management controller, according to one embodiment.

FIG. 8 is an example flow chart of a method to couple RTM 400 to carrier board management controller 305 on carrier board 110, according to one embodiment. In this embodiment, carrier board 110 is received and coupled to backplane 150 of modular platform 100 as depicted in FIG. 1. Accordingly, carrier board control logic 204 may already have invoked an instance of carrier board manager 214 to monitor module interfaces 306A-H and RTM interface 307 for indications of modules received or removed from these interfaces.

The process begins in block 810, where according to an embodiment, RTM 400 is to be received and coupled to RTM interface 307 of carrier board 110. In one implementation, to detect when an RTM is received and coupled to RTM interface 307, detect feature 612 may monitor RTM interface 307. For example, detect feature 612 may monitor impedance on a pin, connector, or wire within or responsive to RTM interface 307. Accordingly, when RTM 400 is received and coupled to RTM interface 307, detect feature 612 may detect this receipt and coupling by changes in the impedance on a pin, connector or wire in RTM interface 307, although detection of coupling is not limited in this regard. Detect feature 612 may then populate and/or update a survey table temporarily stored in a memory (e.g., memory 630) to reflect the coupling of RTM 400 to carrier board 110. This survey table may also include an indication of all other modules that are received and coupled to other interfaces on carrier board 110.

In block 820, once detect feature 612 populates and/or updates the survey table, management engine 630 invokes an instance of couple feature 614. In one implementation, couple feature 614 may access the survey table and logically couple RTM 400 to carrier board management controller 305 through one or more communication channels in RTM interface 307 (e.g., IPMB-L, control interface, LVDS I/O ports). Couple feature 614 may then populate and/or update a module configuration table to reflect this logical coupling and then store this table in a memory (e.g., memory 630). The module configuration table may indicate, for example, the logical coupling of RTM 400 to carrier board management controller 305 as well as the logical coupling of other modules to carrier board management controller 305.

In block 830, once the module configuration table is populated/updated by couple feature 614, management engine 630 invokes an instance of management feature 616 to facilitate the management of RTM 400 in the same manner as front accessible modules received and coupled to module interfaces 306A-H. In one implementation, management feature 616 may use the module configuration table to facilitate management and/or control of RTM 400 and to route communications from modular platform 100's shelf manager and/or other modules received and coupled to interfaces on carrier board 110. The process may start over at block 810 if RTM 400 is removed from carrier board 110 and another RTM is received and coupled to interface 307.

Reference is made again to the illustration of electronic system 200 in FIG. 2 where electronic system 200 may represent the hardware and/or software elements responsive to or resident on carrier board 110. In accordance with one embodiment, carrier board control logic 204 controls the overall operation of electronic system 200 and is intended to represent any of a wide variety of logic device(s) and/or executable content to implement the operation of electronic system 200, described herein. In this regard, carrier board control logic 204 may well comprise a microprocessor, network processor, microcontroller, FPGA, ASIC, executable content to implement such control features and/or any combination thereof.

In an embodiment, carrier board memory 206 may well include a wide variety of memory media including but not limited to volatile memory, non-volatile memory, flash, programmable variables or states, random access memory (RAM), read-only memory (ROM), flash, or other static or dynamic storage media.

In accordance with one embodiment, machine-readable instructions can be provided to carrier board memory 206 from a form of machine-accessible medium. As used herein, a machine-accessible medium is intended to represent any mechanism that provides (i.e., stores and/or transmits) information in a form readable by a machine (e.g., electronic system 200). For example, a machine-accessible medium may well include: ROM; RAM; magnetic disk storage media; optical storage media; flash memory devices; electrical, optical, acoustical or other form of propagated signals (e.g., carrier waves, infrared signals, digital signals); and the like. Instructions may also be provided to carrier board memory 206 via a remote connection through carrier board I/O interfaces 208 (e.g., over a communication network).

Carrier board I/O interfaces 208 may enable one or more element(s), e.g., carrier board control logic 204, to interact with input and/or output devices, for example, a mouse, keyboard, touchpad, cathode ray tube monitor, liquid crystal display, etc.

Carrier board management controller 210 may well comprise one or more of a microprocessor, network processor, microcontroller, FPGA, ASIC, or executable content to implement such control features, and/or any combination thereof. In alternate embodiments, the features and functionality of carrier board management controller 210 may well be implemented within carrier board control logic 204.

According to one embodiment, carrier board manager 214's logical coupling and facilitation of management and/or control of one or more modules may well be implemented in hardware, software, firmware, or any combination thereof. For example, carrier board manager 214 may well be implemented as one or more of an ASIC, special function controller or processor, FPGA, other hardware device, and firmware or software to perform at least the functions described herein. In an alternative embodiment, the functionality of carrier board manager 214 may be implemented within carrier board management controller 210.

In the previous descriptions, for the purpose of explanation, numerous specific details were set forth in order to provide a thorough understanding of the invention. It will be apparent, however, to one skilled in the art, that the invention can be practiced without these specific details. In other instances, structures and devices were shown in block diagram form in order to avoid obscuring the invention.

References made in the specification to the term "responsive to" are not limited to responsiveness to only a particular feature and/or structure. A feature may also be "responsive to" another feature and/or structure and also be located within or resident on that feature and/or structure. Additionally, the term "responsive to" may also be synonymous with other terms such as "communicatively coupled to" or "operatively coupled to", although the term is not limited in this regard.

References made in the specification to "one embodiment" or "an embodiment" means that a particular feature, structure or characteristic described in connection with that embodiment is included in at least one embodiment of the invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily referring to the same embodiment.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative of, rather than limiting the scope and coverage of the claims appended hereto.

What is claimed is:

1. A method comprising:
   detecting a rear transition module (RTM) coupled to an interface resident on a carrier board, wherein the carrier board is coupled to a backplane;
   logically coupling the RTM to a management controller resident on the carrier board, logically coupling to include coupling the management controller resident on the carrier board to a management controller resident on the RTM through a management channel in the interface resident on the carrier board; and
   managing the RTM in a same manner as a front accessible module coupled to another interface resident on the carrier board, the managing to include routing management and control instructions from the management controller resident on the carrier board to the management controller resident on the RTM, wherein management and control instructions include power management and RTM activation based on the RTM's compatibility with the carrier board.

2. A method according to claim 1, wherein detecting the RTM coupled to the interface comprises monitoring the interface and determining the RTM is coupled when the RTM is received and coupled to the interface.

3. A method according to claim 1, wherein management and control instructions further include power management and RTM activation based on the RTM's compatibility with modules responsive to the carrier board.

4. A method according to claim 1, wherein the interface resident on the carrier board includes a low voltage differential signaling (LVDS) input/output (I/O) port and managing the RTM in the same manner further includes mapping the LVDS I/O port in the same manner as mapping another LVDS I/O port in the other interface resident on the carrier board.

5. An apparatus comprising:
   a carrier board including an interface to receive and couple a rear transition module (RTM), wherein the carrier board couples to a backplane; and
   a carrier board manager to logically couple the RTM to a management controller resident on the carrier board, logically coupling to include coupling the management controller resident on the carrier board to a management controller resident on the RTM through a management channel in the interface to receive and couple the RTM to the carrier board, the logically coupling to facilitate management of the RTM in a same manner as a front accessible module coupled to the carrier board by routing management and control instructions from the management controller resident on the carrier board to the management controller resident on the RTM, wherein management and control instructions include power management and RTM activation based on the RTM's compatibility with the carrier board.

6. An apparatus according to claim 5, wherein the management controller resident on the carrier board communicatively couples to a management channel on the backplane.

7. An apparatus according to claim 6, wherein the backplane and the carrier board are compliant with the Advanced Telecommunications Computing Architecture Base specification and the management channel comprises an Intelligent Platform Management Bus.

8. An apparatus according to claim 7, wherein the management controller resident on the carrier board comprises an Intelligent Platform Management Controller (IPMC).

9. An apparatus according to claim 8, wherein the front accessible module is an Advanced Mezzanine Card (AMC) and both the carrier board and the AMC are compliant with the AMC specification.

10. An apparatus according to claim 9, wherein the interface resident on the carrier board includes a low voltage differential signaling (LVDS) input/output (I/O) port and to manage the RTM in the same manner includes mapping the LVDS I/O port in compliance with the AMC specification.

11. An apparatus according to claim 9, wherein the interface resident on the carrier board includes power feeds to provide management and payload voltages to the RTM in compliance with the AMC specification.

12. An apparatus according to claim 8, wherein the RTM is coupled to the IPMC through a management channel in the interface resident on the carrier board.

13. An apparatus according to claim 5, wherein the interface resident on the carrier board includes a control channel to communicate compatibility requirements between the RTM and the management controller resident on the carrier board.

14. An apparatus according to claim 5, the apparatus further comprising:
a memory to store executable content; and
a control logic, communicatively coupled with the memory, to execute the executable content, to implement an instance of the carrier board manager.

15. A system comprising:
a backplane;
a carrier board including an interface to receive and couple a rear transition module (RTM), wherein the carrier board couples to the backplane; and
a carrier board manager to logically couple the RTM to a management controller resident on the carrier board, logically coupling to include coupling the management controller resident on the carrier board to a management controller resident on the RTM through a management channel in the interface to receive and couple the RTM to the carrier board, the logically coupling to facilitate management of the RTM in a same manner as a front accessible module coupled to the carrier board by routing management and control instructions from the management controller resident on the carrier board to the management controller resident on the RTM, wherein management and control instructions include power management and RTM activation based on the RTM's compatibility with the carrier board and with the RTM's compatibility with modules responsive to the carrier board.

16. A system according to claim 15, wherein the management controller resident on the carrier board communicatively couples to a management channel on the backplane.

17. A system according to claim 16, wherein the backplane and the carrier board are compliant with the Advanced Telecommunications Computing Architecture Base specification and the management channel comprises an Intelligent Platform Management Bus.

18. A system according to claim 17, wherein the management controller resident on the carrier board comprises an Intelligent Platform Management Controller (IPMC).

19. A system according to claim 18, wherein the front accessible module is an Advanced Mezzanine Card (AMC) and both the carrier board and the AMC are compliant with the AMC specification.

20. A system according to claim 18, wherein the RTM is coupled to the IPMC through a management channel in the interface resident on the carrier board.

21. A machine-accessible storage medium comprising content, which, when executed by a machine causes the machine to:
detect a rear transition module (RTM) coupled to an interface resident on a carrier board, wherein the carrier board is coupled to a backplane;
logically couple the RTM to a management controller resident on the carrier board, logically coupling to include coupling the management controller resident on the carrier board to a management controller resident on the RTM through a management channel in the interface resident on the carrier board; and
manage the RTM in a same manner as a front accessible module coupled to another interface resident on the carrier board, managing the RTM in the same manner to include routing management and control instructions from the management controller resident on the carrier board to the management controller resident on the RTM, wherein management and control instructions include power management and RTM activation based on the RTM's compatibility with the carrier board.

22. A machine-accessible storage medium according to claim 21, wherein management and control instructions further include power management and RTM activation based on the RTM's compatibility with modules responsive to the carrier board.

23. A machine-accessible storage medium according to claim 21, wherein the interface resident on the carrier board includes a low voltage differential signaling (LVDS) input/output (I/O) port and managing the RTM in the same manner further includes mapping the LVDS I/0 port in the same manner as mapping another LVDS I/0 port in the other interface resident on the carrier board.

* * * * *

UNITED STATES PATENT AND TRADEMARK OFFICE
CERTIFICATE OF CORRECTION

PATENT NO. : 7,266,627 B2  Page 1 of 1
APPLICATION NO. : 11/087331
DATED : September 4, 2007
INVENTOR(S) : DeNies et al.

It is certified that error appears in the above-identified patent and that said Letters Patent is hereby corrected as shown below:

On the Title page, in field (56), under "Other Publications", in column 2, line 15, delete "Advanced TCA" and insert -- AdvancedTCA --, therefor.

On the Title page, in field (56), under "Other Publications", in column 2, line 16, delete "interconnectfor" and insert -- interconnect for --, therefor.

On the Title page, in field (56), under "Other Publications", in column 2, line 18, delete "Advanced TCA" and insert -- AdvancedTCA --, therefor.

In column 12, line 59, in Claim 23, delete "I/0" and insert -- I/O --, therefor.

In column 12, line 60, in Claim 23, delete "I/0" and insert -- I/O --, therefor.

Signed and Sealed this

Twentieth Day of May, 2008

JON W. DUDAS
*Director of the United States Patent and Trademark Office*